Patented Aug. 29, 1939

2,170,806

UNITED STATES PATENT OFFICE 2,170,806

MEROCYANINE DYES CONTAINING A THIONAPHTHENONE NUCLEUS

Leslie G. S. Brooker, Rochester, N. Y., assignor to Eastman Kodak Company, Rochester, N. Y., a corporation of New Jersey No Drawing. Application February 25, 1938, Serial No. 192,610

9 Claims. (Cl. 260—240)

This invention relates to dyes containing a thionaphthenone nucleus and more particularly to what can be called merocarbocyanine dyes containing a thionaphthenone nucleus.

This application is a continuation-in-part of my copending application Serial No. 739,502, filed August 11, 1934.

I have found that 2(1)-thionaphthenones or thioindoxylic acids can be condensed with cyclammonium quaternary salts containing a β-arylaminovinyl group in the alpha or gamma position, i. e., one of the so-called reactive positions, in the presence of a basic condensing agent, to give dyes useful in the preparation of optically sensitized emulsions and in the preparation of light filters.

It is, accordingly, an object of my invention to provide new dyes containing a thionaphthenone nucleus. A further object is to provide a process for the preparation of such dyes. Other more specific objects will become apparent hereinafter.

My new dyes can be represented by the following general formulas:

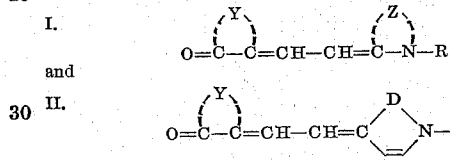

wherein D represents a vinylene or phenylene group, R represents an alkyl group, such as methyl-ethyl, n-amyl, allyl, β-ethoxyethyl, benzyl or β-carboxyethyl for example, Y represents the non-metallic atoms necessary to complete a thionaphthenone nucleus and Z represents the non-metallic atoms necessary to complete a heterocyclic nucleus, such as a five-membered or six-membered heterocyclic nucleus. More specifically, Z can represent the non-metallic atoms necessary to complete a thiazole nucleus, such as an unsubstituted thiazole nucleus, a 4-phenylthiazole nucleus, a 5-methyl-4-phenylthiazole nucleus, a benzothiazole nucleus, a naphthothiazole nucleus or a 4-chlorbenzothiazole nucleus for example, an oxazole nucleus, such as a 4-phenyloxazole nucleus, a benzoxazole nucleus or a naphthoxazole nucleus for example, a selenazole nucleus, such as a 4-phenylselenazole nucleus or a benzoselenazole nucleus for example, a quinoline nucleus, such as a 5-methylquinoline or a 5,6-benezoquinoline nucleus for example, or a pyridine nucleus.

In preparing my new dyes according to my invention, I react a 2(1)-thionaphthenone with a cyclammonium quaternary salt containing a β-arylaminovinyl group in the alpha or gamma position. Acylated β-arylaminovinyl derivatives are advantageously employed. The condensations are effected in the presence of a basic condensing agent. The aforesaid β-arylaminovinyl derivatives are well known and are prepared by condensing a cyclammonium quaternary salt containing a reactive methyl group in the alpha or gamma position with a diarylformamidine. By carrying out the condensations in the presence of organic acid anhydrides, the acylated β-arylaminovinyl derivatives are obtained. Alternatively the β-arylaminovinyl derivatives can be first prepared and then these can be treated with organic acid anhydrides to obtain the β-arylaminovinyl derivatives. Instead of employing a 2(1)-thionaphthenone per se, I can use a thioindoxylic acid which by loss of carbon dioxide becomes a 2(1)-thionaphthenone during the reaction.

As basic condensing agents employed in my process for preparing my new dyes, I have found that strong organic bases, i. e., organic bases whose aqueous solutions have dissociation constants substantially greater than an aqueous solution of pyridine, are advantageously employed. Typical strong organic bases are: triethylamine, piperidine, N-methylpiperidine, triethanolamine and tributylamine. Other basic condensing agents can be employed, for example sodium acetate or propionate or sodium or potassium carbonate.

My new dye condensations are advantageously effected in the presence of a diluent. Lower aliphatic alcohols, i. e., those of the formula $C_nH_{2n+1}OH$ wherein $n$ represents a positive integer not greater than four, are advantageously employed. Heat accelerates the formation of my new dyes.

While the process of preparing my new dyes is subject to variation, particularly as respects the nature and quantity of 2(1)-thionaphthenone or thioindoxylic acid employed, the nature and quantity of β-arylaminovinyl derivative employed, the nature and quantity of basic condensing agent employed, the nature and quantity of diluent, if any employed, the temperatures employed and the method of isolation and purification of the dyes, the following examples will serve to illustrate the manner of obtaining my new dyes. These examples are not intended to limit my invention.

EXAMPLE 1.—*1-(2-ethyl-1-benzothiazylidene-ethylidene)-2(1)-thionaphthenone*

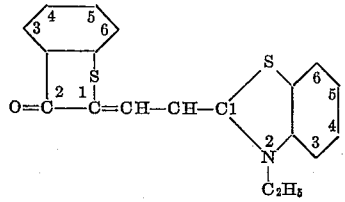

0.97 part of thioindoxylic acid and 2.25 parts of 1 - (β-acetanilidovinyl) - benzothiazole ethiodide were refluxed with 15 parts of absolute ethyl alcohol and 0.5 part of triethylamine for about fifteen minutes. The dye was filtered from the cooled reaction mixture. It was recrystallized from methyl alcohol and obtained as purplish needles which gave a crimson methyl alcohol solution. This dye can also be called (2-ethyl-1-benzothiazylidene-ethylidene)-thioindogenide.

EXAMPLE 2.—*1 - (3 - Methyl- 2 -thiazolinylidene - ethylidene)-2(1)-thionaphthenone*

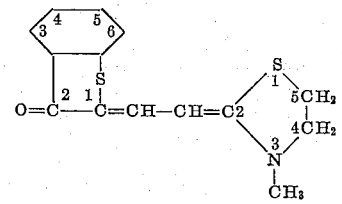

3.14 parts of 2 - (β-anilinovinyl) - thiazoline methiodide, 1.5 parts of 2(1)-thionaphthenone and 1.0 part of triethylamine were heated at the refluxing temperature in about 25 cc. of absolute ethyl alcohol for about fifteen minutes. An orange coloration developed. The dye separated slowly. The reaction mixture was chilled and the dye filtered off and washed with methyl alcohol. It was recrystallized from glacial acetic acid and obtained as red crystals.

EXAMPLE 3.—*1-(1-Ethyl-4-quinolylidene-ethylidene)-2(1)-thionaphthenone*

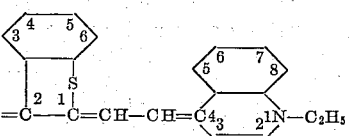

2.2 parts of 4-(β-acetanilidovinyl)-quinoline ethiodide, 0.75 part of 2(1)-thionaphthenone and 0.5 part of triethylamine were refluxed for about fifteen minutes in 25 cc. of absolute ethyl alcohol. A blue coloration developed. The dye separated slowly. The reaction mixture was chilled and the dye filtered off and washed with methyl alcohol. It was recrystallized from methyl alcohol and obtained as green needles having a green reflex.

EXAMPLE 4.—*1 - ( 2 - Ethyl- 1 -benzoxazylidene - ethylidene)-2(1)-thionaphthenone*

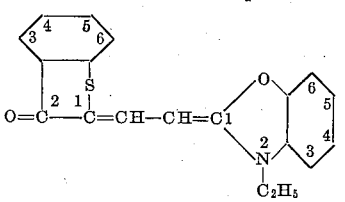

2.17 parts of 2-(β-acetanilidovinyl)-benzoxazole ethiodide, 0.75 part of 2(1)-thionaphthenone and 0.55 part of triethylamine were heated at the refluxing temperature in 25 cc. of absolute ethyl alcohol for about fifteen minutes. An orange coloration developed. The reaction mixture was chilled, the dye filtered off and washed with methyl alcohol. It was recrystallized from methyl alcohol and obtained as bright red crystals having a greenish-blue reflex.

EXAMPLE 5.—*1-(1-Ethyl-2-quinolylidene-ethylidene)-2(1)-thionaphthenone*

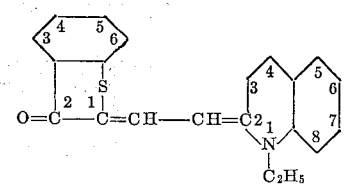

2.01 parts of 2-(β-anilinovinyl)-quinoline ethiodide, 0.75 part of 2(1)-thionaphthenone and 0.58 part of anhydrous sodium carbonate were fused together with stirring at about 180° C. for about ten minutes. The reaction mass was chilled, stirred with methyl alcohol and then filtered from the methyl alcohol. The reaction product was washed with methyl alcohol and finally recrystallized from methyl alcohol. The dye was obtained as green needles.

Cyclammonium quaternary salts containing a β-arylamino-vinyl group in a reactive position can be prepared by well known processes. The following examples are illustrative:

EXAMPLE 6.—*4-(β-anilinovinyl)-quinoline ethiodide*

29.9 parts of lepidine ethiodide were intimately mixed with 19.6 parts of diphenylformamidine and the mixture heated at 150° C. to 160° C. for about ten minutes with stirring. The reaction mixture was cooled and then ground with acetone. The acetone-treated product was recrystallized from methyl alcohol and obtained as red crystals having a blue reflex.

EXAMPLE 7.—*1-(β-acetanilidovinyl)-benzoxazole ethiodide*

58 parts of 1-methylbenzoxazole ethiodide and 40 parts of diphenylformamidine and 270 parts of acetic anhydride were refluxed for about twenty minutes. The reaction product separated from the chilled reaction mixture. It can be employed without further purification.

EXAMPLE 8.—*1-(β-acetanilidovinyl) - benzothiazole ethiodide*

67 parts of 1-methylbenzothiazole ethiodide and 48 parts of diphenylformamidine and 395 parts of acetic anhydride were refluxed for about twenty minutes. The reaction product separated from the chilled reaction mixture. It can be employed without further purification.

EXAMPLE 9.—*2-(β-anilinovinyl)-thiazoline methiodide*

243 parts of 2-methylthiazoline methiodide and 196 parts of diphenylformamidine were intimately mixed together and the mixture heated at 140° C. for about ten minutes. 200 cc. of 95% ethyl alcohol were added while the reaction mixture was warm. The reaction product went into solution and then, when the solution cooled, crystallized out. It was filtered off and washed with ethyl alcohol.

EXAMPLE 10.—2-(β-acetanilidovinyl)-quinoline ethiodide 60 parts of quinaldine ethiodide and 40 parts of diphenylformamidine were intimately mixed together and the mixture was heated, with stirring, at about 180° C. for about ten minutes. The cooled reaction mixture was ground with acetone, filtered from the acetone and dried. 20 parts of this material were refluxed in about 50 parts of acetic anhydride for about ten minutes. The reaction mixture was chilled and the 2-(β-acetanilidovinyl)-quinoline ethiodide which separated was filtered off and washed with acetone.

EXAMPLE 11.—4-(β-acetanilidovinyl)-quinoline ethiodide 29.9 parts of lepidine ethiodide and 19.6 parts of diphenylformamidine were intimately mixed together and heated, with stirring, at 150° C. to 160° C. for about ten minutes. The cooled reaction mixture was stirred with acetone and the acetone removed. The acetone-treated product was then refluxed, in sufficient acetic anhydride to form a solution, for about fifteen minutes. One molecular proportion of pyridine for each molecular proportion of reaction product is advantageously employed in the solution during refluxing. The 4-(β-acetanilidovinyl)-quinoline ethiodide was precipitated from the acetic anhydride reaction mixture by adding diethyl ether. The precipitated product was washed with acetone and dried.

In the above examples the parts given are by weight.

Diarylformamidines can be prepared as described by Claisen in Annalen, vol. 287, page 366 (1895) and by Comstock and Wheeler in the American Chemical Journal, vol. 13, page 516 (1891) and by Dains in the Berichte der deutschen chemischen Gesellschaft, vol. 35, pages 2498–2501 (1902).

My new dyes probably exist in two forms which are convertible the one into the other. These forms can be illustrated for the dyes of Formula I as follows:

Ia.
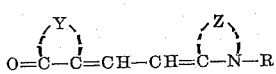

and

Ib.
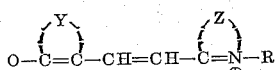

The preparation of cyclammonium aralkyl quaternary salts is described in the copending application of Leslie G. S. Brooker and Lloyd A. Smith, Serial No. 175,686, filed November 20, 1937. The preparation of cyclammonium alkoxyalkyl and carbalkoxyalkyl quaternary salts is described in the copending application of Leslie G. S. Brooker and Lloyd A. Smith, Serial No. 180,214, filed December 16, 1937.

What I claim as my invention and desire to be secured by Letters Patent of the United States is:

1. A dye characterized by a formula selected from the group consisting of the following formulas:

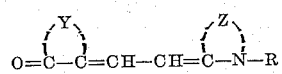

and

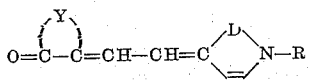

wherein D represents an organic group selected from the group consisting of vinylene and phenylene groups, R represents an alkyl group, Y represents the non-metallic atoms necessary to complete a 2(1)-thionaphthenone nucleus and Z represents the non-metallic atoms necessary to complete a heterocyclic nucleus selected from the group consisting of five-membered and six-membered heterocyclic nuclei.

2. A dye characterized by the following formula:

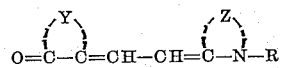

where R represents an alkyl group, Y represents the non-metallic atoms necessary to complete a 2(1)-thionaphthenone nucleus and Z represents the non-metallic atoms necessary to complete a thiazole nucleus.

3. A dye characterized by the following formula:

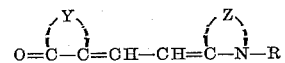

wherein R represents an alkyl group, Y represents the non-metallic atoms necessary to complete a 2(1)-thionaphthenone nucleus and Z represents the non-metallic atoms necessary to complete a benzothiazole nucleus.

4. 1-(2-ethyl-1-benzothiazylidene-ethylidene)-2(1)-thionaphthenone.

5. A dye characterized by the following formula:

wherein R represents an alkyl group, Y represents the non-metallic atoms necessary to complete a 2(1)-thionaphthenone nucleus and Z represents the non-metallic atoms necessary to complete an oxazole nucleus.

6. A dye characterized by the following formula:

wherein R represents an alkyl group, Y represents the non-metallic atoms necessary to complete a 2(1)-thionaphthenone nucleus and Z represents the non-metallic atoms necessary to complete a benzoxazole nucleus.

7. 1-(2-ethyl-1-benzoxazylidene-ethylidene)-2(1)-thionaphthenone.

8. A dye characterized by the following formula:

wherein R represents an alkyl group, Y represents the non-metallic atoms necessary to complete a 2(1)-thionaphthenone nucleus and Z represents the non-metallic atoms necessary to complete a thiazoline nucleus.

9. 1-(3-methyl-2-thiazolinylidene-ethylidene)-2(1)-thionaphthenone.

LESLIE G. S. BROOKER.